(12) United States Patent
Keydel et al.

(10) Patent No.: US 6,388,606 B1
(45) Date of Patent: May 14, 2002

(54) AIRCRAFT OR SPACECRAFT BASED SYNTHETIC APERTURE RADAR

(75) Inventors: Wolfgang Keydel, Hechendorf; Helmut Suss, Gilching; Karl-Heinz Zeller, Furstenfeldbruck; Reinhard Schröder, Oilching, all of (DE)

(73) Assignee: Deutsches Zentrum fur Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/639,329

(22) Filed: Aug. 16, 2000

(30) Foreign Application Priority Data

Aug. 18, 1999 (DE) .......................... 199 38 592

(51) Int. Cl.$^7$ ............................... G01S 13/90
(52) U.S. Cl. .................... 342/25; 342/59; 342/159; 342/195
(58) Field of Search .................. 342/25, 59, 159, 342/160–164, 190–197

(56) References Cited

U.S. PATENT DOCUMENTS 4,551,724 A * 11/1985 Goldstein et al. ............. 342/25
4,727,373 A * 2/1988 Hoover .......................... 342/25
5,260,708 A * 11/1993 Auterman ..................... 342/25

FOREIGN PATENT DOCUMENTS

DE    3712065 C1    9/1980    ........... G01S/13/90

OTHER PUBLICATIONS

Patent Abstracts of Japan, Publication No. 61–140884, Publication Date Jun. 26, 1986.

* cited by examiner

Primary Examiner—Bernarr E. Gregory
(74) Attorney, Agent, or Firm—Browdy and Neimark (57) ABSTRACT

In the inventive aircraft based or spacecraft based radar system with synthetic antenna aperture (SAR=Synthetic Aperture Radar) a transmit antenna and a receive antenna are provided according to a bistatic radar, which are arranged above the earth's surface, physically separate and on different platforms of which at least one is moving, so that a relative movement results between the transmit antenna and the receive antenna. Either the transmit antenna, the receive antenna, or both antennas are designed for ambiguity suppression. The radar system according to the invention is useful particularly for the systematic imaging of the earth's surface.

17 Claims, 5 Drawing Sheets

AIRCRAFT OR SPACECRAFT BASED SYNTHETIC APERTURE RADAR

BACKGROUND OF THE INVENTION

1. Technical Field of the Invention

The present invention relates to an aircraft or spacecraft based radar system with synthetic antenna aperture (SAR= Synthetic Aperture Radar) for imaging the earth's surface in such a way that an ambiguity suppression is provided by means of a minimum antenna directionality with side lobe suppression resulting in a swath illumination on the ground.

2. Prior Art

By now, numerous SAR systems are used worldwide to image the earth's surface. These systems may be implemented both mounted on an aircraft, as well as mounted on a spacecraft, e.g., on a satellite. In comparison to optical imaging, SAR systems are unable to use natural light sources, but must themselves illuminate the area to be imaged in the desired frequency range in a suitable manner.

In the known SAR systems this is achieved by using a single antenna for both the transmit and the receive operation. A SAR system of this type, which may also be referred to as a monostatic SAR system, requires a pulsed radar operation whereby the transmit pulses are limited in time, so that the time between every two successive pulses can be used for the receive operation. This radar mode has some principle-based shortcomings and limitations.

Figure 1:
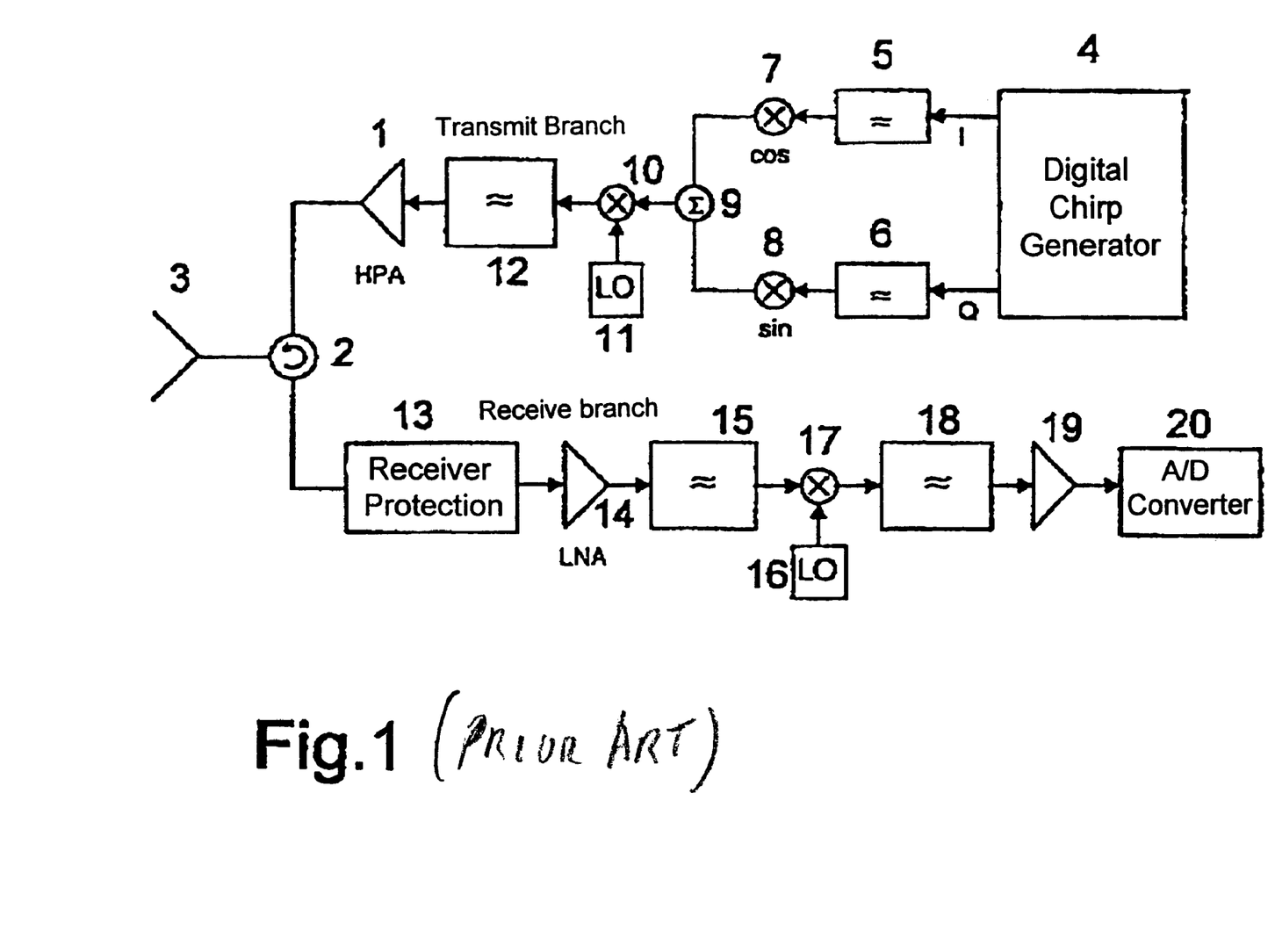
FIG. 1 shows the block diagram of the front end of a conventional SAR system according to the monostatic principle, which was already described in the introductory part.

In the conventional monostatic SAR systems, as shown with the aid of an example in FIG. 1, the transmit pulses coming from a high power amplifier (HPA) 1 in the transmit branch are switched via an RF circulator 2 to an antenna 3, and emitted from there into space toward the ground. The transmit pulses are first processed in the transmit branch by a digital chirp generator 4 and routed via two quadrature channels I and Q with respective filters 5 and 6 and respective mixing steps 7 and 8 to an adder 9. Afterwards they are converted to the transmit frequency position by means of a mixing step 10, which is furthermore operated with the frequency of a local oscillator 11, after which they are filtered with the aid of an RF filter 12. Afterwards they are routed to the aforementioned high power amplifier 1. The radar echoes that arrive between successive transmit pulses are received by the same antenna 3 and switched via the HF circular 2 and a receiver protection circuit 13 in the receive branch to a low noise amplifier (LNA) 14.

After pre-filtering in an HF filter 15, mixing with the frequency of a local oscillator 16 in a mixing step 17, filtering into the baseband by means of a filter 18, sufficient amplification with the aid of an amplifier 19, and analog/digital conversion by means of an analog/digital converter 20, the standard processing methods for the SAR image generation are applied to the raw radar data that have been obtained in this manner.

The described SAR system of the monostatic type, which is known, e.g., from U.S. Pat. No. 4,866,446, and in comparable form for topographic mapping also from DE 37 12 065 C1, has a number of shortcomings, however.

The circulator that is necessary to use a single antenna results in losses and has only a limited decoupling between the transmit branch and the receive branch. In combination with the receiver protection circuit, which is therefore required, this leads to higher losses and a deterioration of the system noise factor. Also, the maximum peak transmitting power of monostatic systems is presently limited by the receiver protection circuit, which can be implemented only to a certain extent. Also of disadvantage are the complex power supply and the high EMC (electromagnetic compatibility) load on the total system, which results because high peak transmitting outputs become necessary in the pulse operation. The dimensioning of the transmit pulse length must take into consideration the requirements of the receive window. A reduction of the transmit pulse length, however, necessitates an increase in the transmitting power if a constant signal/noise ratio is to be maintained.

In the known monostatic SAR system, a limited flexibility of the total system furthermore results when special SAR operating modes are implemented, and when interferometric measurements are performed. Also, a monostatic SAR system is not capable of transmitting and receiving simultaneously. During the transmit operation a reception is not possible, and during reception of the radar echo no transmit pulse can be emitted. This limits the maximum time available for the scanning of a radar echo to a fraction of the transmit pulse interval. Since the transmit pulse interval, too, must not fall below a minimum value, which is dictated mainly by the resolution, a largest possible maximum image swath width exists, which is dependent mainly upon the required resolution and which cannot be exceeded.

For spacecraft based SAR systems, this maximum image swath width is approximately 8 to 20 km, depending on the incident angle, at a resolution of 1 m, or approximately 40 to 100 km at a resolution of 5 m.

The inability of the known monostatic SAR system to simultaneously transmit and receive furthermore means that those range domains cannot be imaged for which the time delay of the radar wave is an integral multiple of the transmit pulse interval. In order to still be able to image these range domains, the transmit pulse interval or the pulse repetition frequency (PRF) of the transmit pulses must be changed. However, during each such switching process, the end of the time delay of the radar wave must be waited for, which means system losses and which, ultimately, further limits the resolution that can be attained with the SAR system.

Since the incident angle and the angle of reflection are always the same in the known monostatic SAR system, and located on the same side of the perpendicular to the area to be imaged, the backscatter characteristics of the surface to be imaged can be measured only for identical incident and reflection angles, which means that a large part of the microwave characteristics of the surface to be imaged, therefore, cannot be registered by the known SAR system of the monostatic type.

It is true that a radar system with a synthetic aperture of the biostatic type is already known from JP 61-140 884 A, wherein a transmit antenna and a receive antenna are provided, which are physically separate and at least one of which, namely the transmit antenna, moves so that a relative movement results between the transmit antenna and the receive antenna. The transmit antenna, which is arranged on a moving platform, is located above the earth's surface; however, the receive antenna with its related reception and evaluation system is not. Instead, the receive antenna is located on the ground or on a ship.

The receive antenna which is mounted stationary on the ground or on a ship, receives the portions of the signals that are reflected from a specific target object, which come from the transmit antenna that moves above the earth's surface. The specific target object is also located above the earth=s surface, since a receive antenna mounted on the ground would not be able to receive meaningful reflection signals from a target object that is also located on the ground, for reasons of the usually present unevenness of the ground and the curvature of the earth's surface alone. This SAR radar system, because of its design with a receive antenna mounted stationary on the ground or on a ship, is therefore not suitable at all for imaging ground structures, and its bistatic characteristics also cannot be transferred to a monostatic SAR radar system intended to image the earth=s surface.

OBJECT AND SUMMARY OF THE INVENTION

It is the aim of the invention to create a SAR system for imaging the earth's surface that permits, without significant system losses and with a high attainable resolution, a greater flexibility both in the image arrangement, as well as in the suppression of the described ambiguities, and permits a noticeable increase in the swath width. Furthermore, the SAR system to be created should be easy to implement and also result in some cost reductions.

In accordance with the invention, which relates to a radar system of the above type, this aim is met in such a way that the antenna is divided into a transmit antenna and a receive antenna according to the bistatic radar, which is known per se, and that these antennas are provided in physically separate locations, that the transmit antenna and the receive antenna are located above the earth's surface to be imaged, on different platforms of which at least one is moving so that a relative movement results between the transmit antenna and the receive antenna, and that either the transmit antenna, the receive antenna, or both antennas are designed for ambiguity suppression.

With the bistatic SAR system according to the invention it is possible to transmit and receive at the same time. It is even possible to transmit and receive continuously, in such a way that the transmit signal is periodically repeated in certain time intervals (transmit pulse interval). The transmit signal may advantageously be a frequency modulated continuous (FMCW) signal. In that case the transmit signal may, for example, be frequency modulated in a saw-tooth pattern and traverses the entire system bandwidth before it jumps back to the starting frequency after the transmit pulse interval has ended.

However, other periodic modulation types that utilize the entire system bandwidth are possible as well. As with the monostatic SAR system, this transmit pulse interval results in local ambiguities. Ambiguity areas from which radar echoes reach the instrument offset by one or more transmit pulse intervals must be suppressed.

It is an objective of the antenna to suppress these ambiguities. In monostatic SAR systems there is only a single antenna. This antenna must reliably and with sufficient strength suppress the ambiguity areas from which the radar echoes reach the instrument at the same time and with the same Doppler shift as the radar echoes that come from the target area to be imaged. To this effect the antenna must maintain a certain minimum directionality, and the side lobes in the antenna directivity pattern must be sufficiently suppressed. The demand for a certain minimum directivity also means that only a certain swath width can be illuminated. The current satellite based SAR systems that work according to the monostatic principle are all designed according to this system limit.

In the bistatic SAR system according to the invention, a selection can first be made, as to which antenna (transmit antenna or receive antenna, or also both) is to suppress the ambiguities. The system can thus, in contrast to the monostatic principle, be designed such that the antenna lobe of the transmit antenna is so wide that the entire look area is illuminated from the smallest to the largest incident angles without having to pay attention to ambiguity zones. The suppression of ambiguity zones is then performed solely by the receive antenna or antennas. With a wide-swath system design like this, the demands on the transmit antenna, therefore, are only minor. One should merely make sure that no transmitting power is wasted to areas that cannot be imaged and that the swath to be imaged is illuminated fairly homogeneously. The transmit antenna in spacecraft based systems thus becomes comparatively small and economical.

The receive antenna, on the other hand, should generally be tapered to attain the side lobe attenuation of approximately 25 dB required for a good ambiguity suppression. In comparison to the transmit antenna, the receive antennas will thus have a large area, with high demands on the manufacturing accuracy. However, the receive antennas can be directed at random within the access swath illuminated by the transmit antenna. There are no dead zones as with the monostatic SAR system.

By putting together a plurality of swaths that are free of ambiguities in themselves the entire look area of the transmitter/receiver combination can, on principle, be imaged with the inventive bistatic SAR without limitation of the possible resolution and regardless of the applied pulse repetition frequency. For each of these swaths that are free of ambiguities in themselves, a separate antenna may be used, and also a separate platform, e.g., in the form of a satellite. However, the implementation is also possible with only one receive antenna, namely when a principle is used, which is related to the principle of the phased antenna array.

In the phased antenna array, the antenna is divided, in the elevation, into several lines. Each of these lines has its own adjustable time delay shifter, so that the signal time delay can be adjusted separately for each antenna line before the signals of the individual lines are added up to the antenna sum signal. With suitable adjustments of the time delay shifters, the direction of the main antenna lobe can be adjusted. If amplitude adjusters are added to the time delay shifters, the width of the main antenna lobe can be adjusted as well. In a physically implemented phased antenna array, a main antenna lobe can be precisely implemented that can be swiveled and shaped in a wide area. If it were desired to implement several electronic antennas that are oriented in different directions using, however, only one physical receive antenna, a separate time delay shifter and gain adjuster would be required for each of these electronic antennas. In that case the antenna would thus become extremely complex.

BRIEF DESCRIPTION OF THE DRAWINGS

The invention will be explained in more detail below, based on drawings, in which.

DETAILED DESCRIPTION OF THE PREFERRED EMBODIMENT(S) OF THE DRAWINGS

In the conventional SAR receive branch, the received antenna sum signal is amplified, filtered, down converted and scanned in the analog/digital converter as shown in FIG. 1. Modern analog/digital converters are sufficiently fast, so that the down conversion to a lower frequency can be skipped and taken care of concurrently by the scanning process. Accordingly, all that is required in the receive branch is a low-noise amplifier, a filter for suppressing ambiguities in the frequency range, as well as a fast analog/digital converter.

Figure 2:
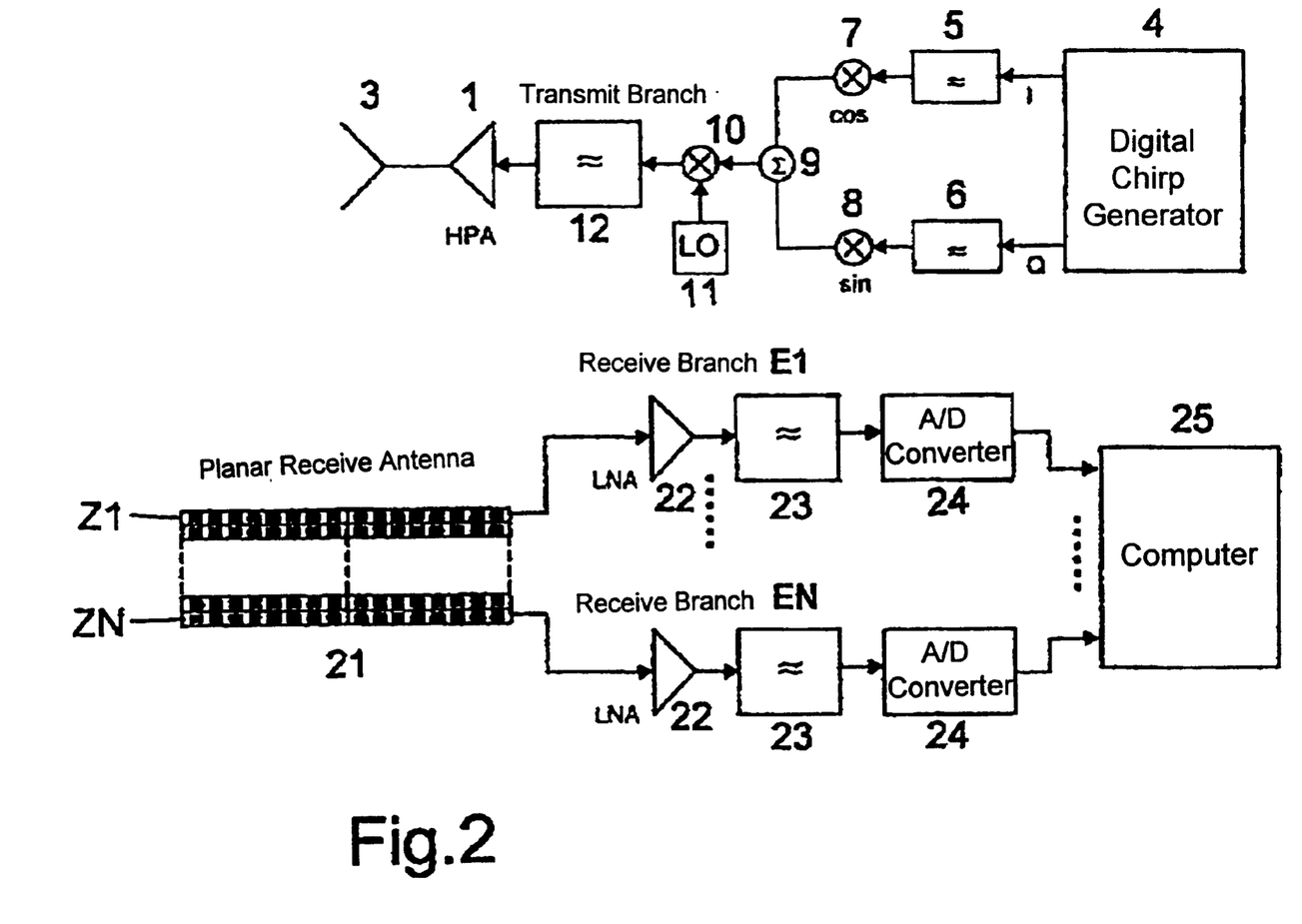
FIG. 2 shows the block diagram of the front end of a bistatic SAR system according to the invention with digital beam formation.

As shown in FIG. 2, such an economical receiver chain is implemented for each antenna line Z1 . . . ZN of a planar receive antenna 21 designed in the form of a phased antenna array. To each antenna line Z1 . . . ZN a receive branch E1 . . . EN is thus connected, each of which consists of a low-noise amplifier 22, a filter 23 for suppressing ambiguities in the frequency range, as well as a fast analog/digital converter 24. The digitized output signals from the analog/digital converters 24 of all receive branches E1 . . . EN are entered into a computer 25. The signal time delay and the amplitude (gain) can then be adjusted with high precision in the processing computer 25.

The formation of the antenna sum signal thus takes place only in the computer 25, and the implementation of as many different electronic antennas as desired with only one physical antenna no longer requires complex hardware but only computing time (digital beam forming). The high side-lobe attenuation that is required for a good suppression of ambiguities requires a high precision of the time delay shifters and the gain settings. This precision is guaranteed by the computer and is no longer a cost factor.

Furthermore, there no longer exists the need to apply an intricate antenna design in order to go to the limits of the possible image swath width from a single antenna pattern, because the calculation of an additional image swath at any random location within the access swath, which is illuminated widely by the transmitter requires no additional hardware but only additional calculation time.

The transmit branch of the inventive SAR system shown in FIG. 2 is designed similar to the one of the monostatic radar system according to FIG. 1; one merely needs to take into account that the antenna 1 can be a small antenna that is not narrow-beam, and that there is no need for the HF circulator.

The transmit pulses coming from the high power amplifier 1 in the transmit branch are thus lossless linked directly to the antenna 3 and emitted from there into space toward the ground. The transmit pulses are first processed by the digital chirp generator 4 in the transmit branch and routed, via the two quadrature channels I and Q with the respective filters 5 and 6 and the respective mixing steps 7 and 8, to the adder 9. Afterwards they are converted into the transmit frequency position by means of the mixing step 10, which is furthermore operated with the frequency of the local oscillator 11, and then filtered out with the aid of the RF filter 12. Afterwards they are routed to the aforementioned high power amplifier 1.

It is true that a high data rate results when this principle is applied, since several analog/digital converters are connected in parallel. However, given the continuing rapid development of the computer technology, this fact does not pose a major problem. A significantly larger image swath width, which is now limited only by the central illuminator, is obtained in an advantageous manner.

Figure 3:
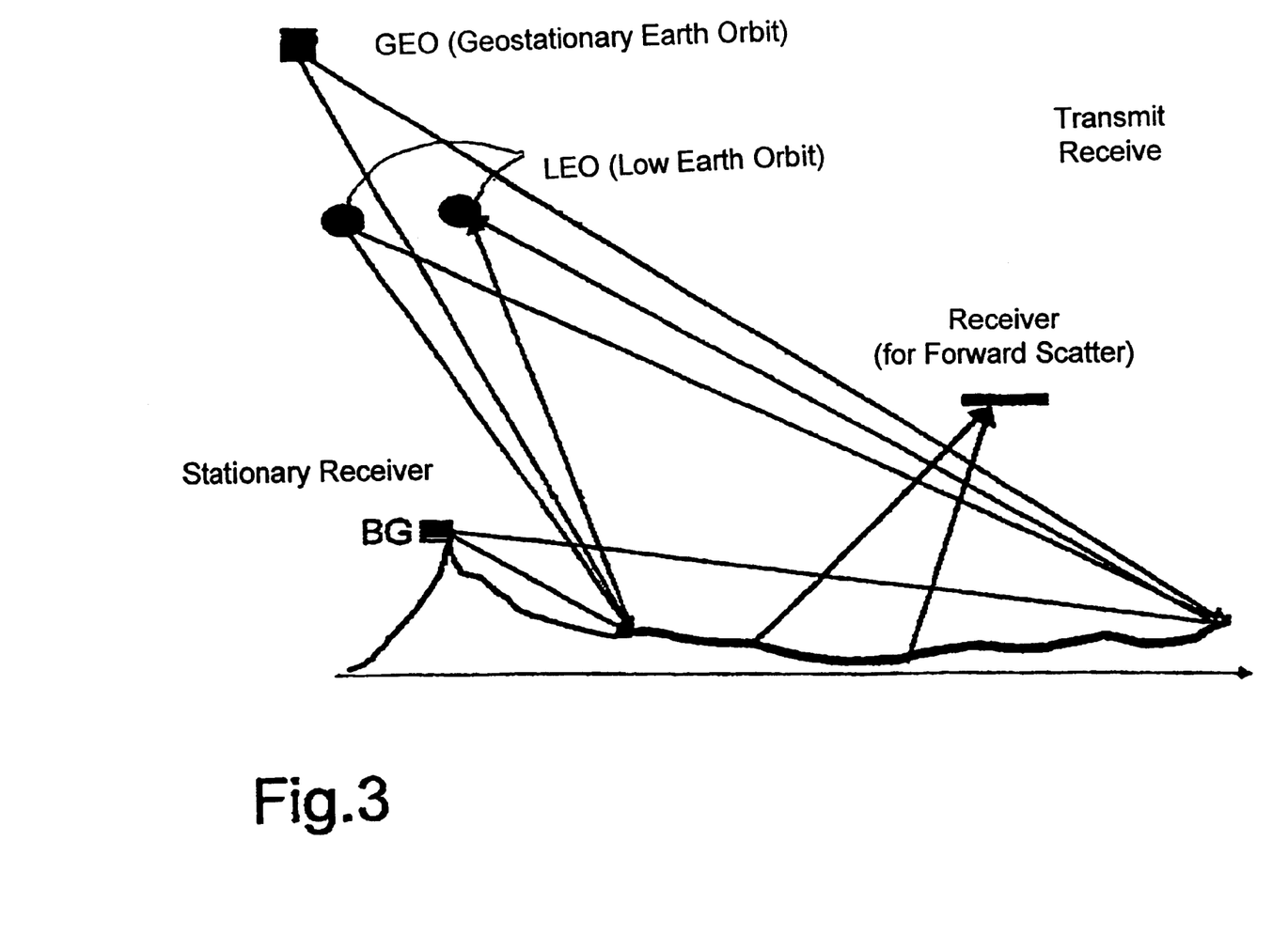
FIG. 3 shows examples for the basic configuration of a bistatic SAR system according to the invention.

The principle of the bistatic SAR system according to the invention with the separation of the transmitting and receiving units on different platforms means that, quite in contrast to the known monostatic principle, the direction of incidence onto the earth's surface does not have to coincide with the registered echo direction of the radar waves. This opens many different ways of implementing an imaging radar system. In FIG. 3 several basic configurations are shown schematically.

Accordingly, the following constellations of the bistatic operation are possible, for example.

1. The transmitter with its transmit antenna is located on a geostationary orbit GEO. One or more receivers belonging to the SAR system are located on a low earth orbit LEO or on an aircraft based platform. The receiver(s) receive the backward scatter of the radar waves emitted by the transmit antenna. The advantage of the backward scatter is the good range resolution of the system attained by the two-way time delay difference of the radar echoes. Of disadvantage is the relatively weak backward reflection of the radar waves.

2. The transmitter with its transmit antenna is located on a geostationary orbit GEO. One or more receivers on a low earth orbit LEO or on an aircraft based platform receive the forward scatter of the radar waves. The advantage of the forward scatter is the strong scatter of the radar waves in the range of the mirror reflection. Of disadvantage is the deterioration of the system's range resolution since the time delay differences of the radar echoes partly offset each other. In the range of the exact mirror reflection (incident angle= reflecting angle) a range resolution is no longer possible.

3. The transmitter moves on a low earth orbit LEO. Three different cases can be distinguished. Either one or more receivers move on an identical orbit LEO, but time-shifted, or one or more receivers move on different orbits, or one or more receivers move on aircraft based platforms.

4. A stationary transmitter is arranged, e.g., on a mountain peak BG. In this case, two different scenarios can be distinguished. Either one or more receivers move on a low earth orbit LEO, or one or more receivers move on aircraft based platforms.

As a matter of principle, all combinations of transmitter and receiver platforms are possible. The only requirement is that at least one of the two platforms must be moving, as the relative movement between the transmit antenna and the receive antenna is the prerequisite for taking advantage of the Doppler effect, which permits the resolution of the image in the direction of the movement.

A fundamental problem, which occurs in all imaging radar systems with synthetic aperture, lies in the occurrence of ambiguities in the range direction due to the slanted look geometry, and in the occurrence of ambiguities in the Doppler spectrum due to the scanning with the pulse repetition frequency. In principle, the suppression of ambiguities is performed by means of suitably selected antenna dimensions, with which ambiguous areas are faded out, so to speak, through a sufficiently narrow antenna beam in such a way that they are then illuminated only by the unavoidable antenna side lobes.

In addition to the increased flexibility in the image arrangement, the bistatic SAR system according to the invention also results in an increased flexibility in the suppression of the described ambiguities.

As a matter of principle, the following possibilities result:

1. The transmit antenna is narrow-beam and thus ensures the ambiguity suppression in the elevation and in the azimuth, whereas the receive antennas have a comparatively moderate directionality and a moderate antenna gain.

2. The receive antennas are narrow-beam and ensure the ambiguity suppression in the azimuth and in the elevation, whereas the transmit antenna is designed small and with moderate directionality and moderate antenna gain.

3. The transmit antenna ensures the ambiguity suppression in the azimuth (narrow-beam in the azimuth corresponding to the resolution requirement), while it illuminates the entire or at least a large portion of the access area in the elevation. The orientation is absolutely uncritical. The receive antennas ensure the ambiguity suppression in the elevation and are wide enough in the azimuth lobe to render the position adjustment of both, the transmit and the receive antenna absolutely uncritical. The minimum directionality for the ambiguity suppression is thus ensured by the interface of the footprints of both antennas, which means that both the transmit and the receive antenna may have relatively small dimensions in comparison to the known monostatic SAR system.

With the assignment of the narrow-beam antenna to the transmitter, this results in the advantage that the receiver satellites may be constructed very small, light-weight and inexpensive, since a short distance exists to the data relay, no data storage is needed, no steering of the main antenna lobe must be performed, the receive antenna may be designed small, the receiver needs to be equipped only with an analog/digital converter, and the data are routed to the relay. One advantage also lies in the fact that the position adjustment of the receiver satellites is uncritical. A disadvantage of the assignment of the narrow-beam antennas to the transmitter may be seen in the fact that the transmitter requires a large antenna with a main lobe that can be steered.

When the narrow-beam antenna is assigned to the receiver, this results in the advantage that, depending on the number of receiver satellites, small target areas can be scanned simultaneously and without loss in resolution. One advantage also lies in the fact that the orientation of the transmit antenna is uncritical. A disadvantage of the assignment of the narrow-beam antenna to the receiver may be seen in the fact that the receive antennas become relatively large-surface and it should be possible to steer them in the elevation.

If the ambiguity suppression in the azimuth is effected exclusively by the transmit antenna and the ambiguity suppression in the elevation exclusively by the receive antenna, this results in the advantage that, depending on the number of receiver satellites, several small target areas can be scanned simultaneously and without loss in resolution. It is also advantageous that the orientation of both the transmit antenna, as well as the receive antenna is uncritical. It is also advantageous that Scan-SAR operation is possible with an antenna that can be steered one-dimensionally (elevation).

The receive antenna can then be oriented rigidly, even though the location of the target area perpendicular to the sensor track is freely selectable within the access swath. If the transmit antenna can be steered in the azimuth and the receive antenna can be steered in the elevation, all special operating modes are possible.

A certain shortcoming of the above-described participation of both antennas in the ambiguity suppression lies in the fact that the transmit antenna must be tapered in a relatively complicated fashion to attain the side lobe attenuation in the azimuth that is required for a good ambiguity suppression and to ensure a reasonably homogenous power density at a target object across the entire access swath in the elevation.

An embodiment of the inventive SAR system will be described below, with the aid of FIGS. 4 and 5.

The feasibility of the described inventive SAR system was examined with SAR simulation tools, the reliability of which was already demonstrated on several occasions with the aid of implemented SAR systems. An embodiment was examined in the form of a SAR system in which a transmitter is placed on a low earth orbit (400 km) and one or more receiver systems are provided on an identical orbit, but with time-shifted movement. A configuration of this type is possible, for example, for an application on the international space station Columbus.

As already discussed above, each imaging SAR system must meet certain requirements regarding its minimum antenna area to be able to still sufficiently suppress the principle-inherent ambiguities. This required minimum antenna area depends on the orbital height and look angle of the system. In FIG. 4. the minimal antenna area of a known monostatic SAR system is shown with an untapered antenna in dependence on the incident angle for an orbital height of 400 km. The upper x-axis represents the distance to the nadir point and thus permits a direct estimate of the access area.

Figure 4:
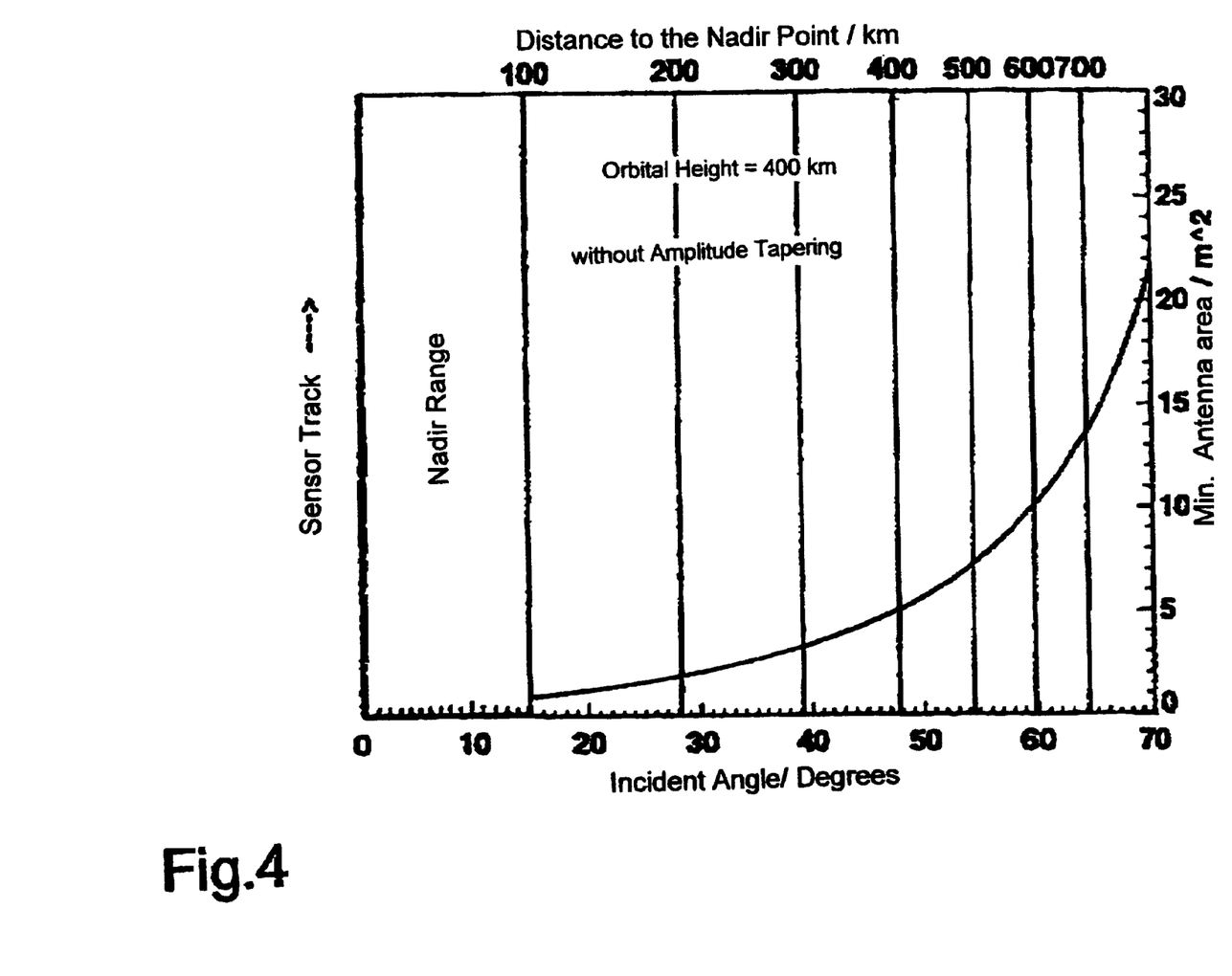
FIG. 4 shows, in a diagram, the minimal antenna area of a conventional monostatic SAR system without weighting in dependence on the incident angle for an orbital height of 400 km.

If, in a bistatic SAR system according to the invention, either the transmit or the receive antenna is made significantly smaller than would really be necessary according to FIG. 4, the suppression of the ambiguities takes place only through the one-way properties of the respective other antenna. If, in comparison to the monostatic case, the side-lobe level is lowered by the factor 2, to e.g., −26 dB, which corresponds to an overall constant ambiguity ratio, the minimal antenna area also increases by the factor 2, since the aperture efficiency decreases accordingly. FIG. 5 illustrates this case for the same orbital height.

For the feasibility estimate a bistatic SAR system with the following basic data was used:

| Transmit antenna: Parabolic reflector | | |
|---|---|---|
| Diameter | = | 0.5 m |
| Aperture angle | = | 4.135 _degree |
| Gain | = | 31.9 dB |

At an orbit height of 400 km, such an antenna would illuminate the following area sizes;

| Incident angle [degrees] | 20 | 35 | 50 |
|---|---|---|---|
| Off-nadir angle [degrees] | 18.7 | 32.6 | 46 |
| Swath width cross track [km] | 33.5 | 43.7 | 69.2 |
| Swath width along track [km] | 31.5 | 35.8 | 44.4 |

Figure 5:
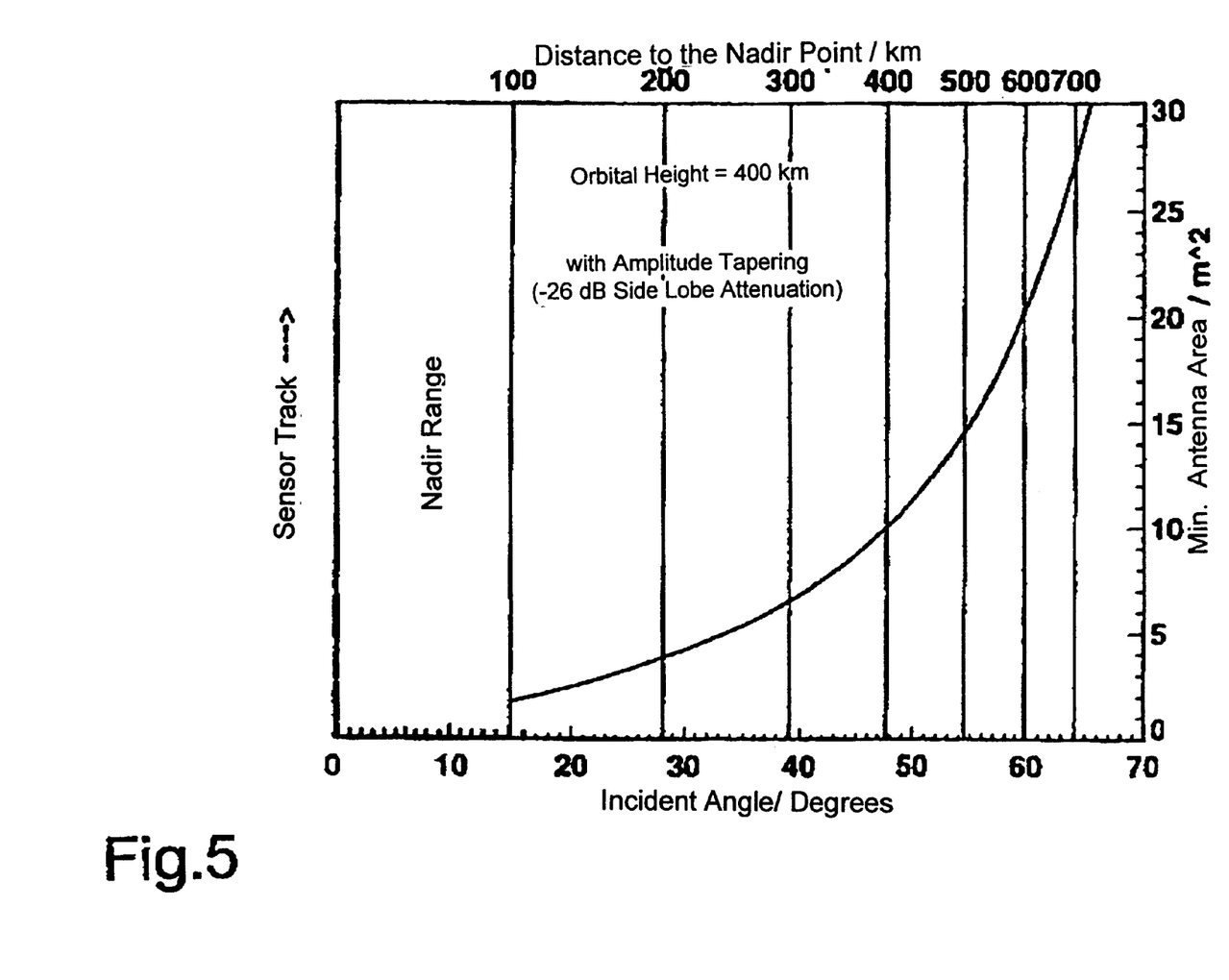
FIG. 5 shows, in a diagram, also in dependence on the incident angle for an orbital height of 400 km the minimal antenna area of the large antenna of a bistatic system according to the invention with 26 dB side lobe suppression.

With the use of such a small transmit antenna, the receive antenna according to FIG. 5, at an incident angle of 50 degrees must have a minimal area of approximately 11.2 m$^2$.

The following configuration was assumed:

| Receive antenna: Planar antenna | | |
|---|---|---|
| Antenna length | = | 12 m |
| Antenna width | = | 0.94 m |
| Antenna area | = | 11.24 m² |
| Main lobe width azimuth | = | 0.19° |
| Main lobe width elevation | = | 2.43° |
| Tapering: | | Triangle tapering in both antenna dimensions (E (x) = 1 − 2\|x\|/a with a = aperture length) |
| Side-lobe attenuation | = | −26.5 dB |
| Gain | = | 47.5 dB |
| Further system parameters: | | |
| Orbital height | = | 400 km |
| Incident angle | = | 50 degree |
| Doppler bandwidth | = | 1645 Hz |
| Processed bandwidth | = | 1200 Hz |
| Pulse repetition frequency (PRF) | = | 2550 Hz |
| Pulse bandwidth | = | 10 MHZ |
| Transmit power (peak) | = | 3 kW |
| Transmit power (medium) | = | 300 W |
| Duty Cycle | = | 10% |
| Receiver noise temperature | = | 650 K (Compare to X-SAR approx. 850 K) |
| Results of the Performance Calculations: | | |
| Resolution azimuth | = | 15.5 m (3 looks) |
| Resolution ground range | = | 17.0–17.7 m |
| Swath width | = | 33 km |
| Necessary data rate | = | 54 Mbit/s |
| Noise equivalent σ° | = | −24.5 dB at swath middle |
| Radiometric resolution | ≈ | 2 dB |
| Total ambiguity ratio | < | −21.5 dB (no processing weighting) |

The simulation results show that such a SAR system can be implemented with a very good image quality and at the same time possesses the aforementioned advantages of the bistatic operation.

What is claimed is:

1. An aircraft or spacecraft based radar system with synthetic antenna aperture for imaging the earth's surface in such a way that a side-lobe suppression and an ambiguity suppression are produced by an antenna directionality such that the width of a resulting ground swath illumination does not generate ambiguity areas caused by radar transmit signal periodicity, said system comprising:

an antenna divided, according to a bistatic radar, into a transmit antenna and a receive antenna, the transmit antenna and the receive antenna being respectively located above a surface of the earth to be imaged on respectively different platforms of which at least one is moving so that a relative movement results between the transmit antenna and the receive antenna, and wherein at least one of the antennas is designed for ambiguity suppression.

2. A radar system according to claim 1, wherein a transmitter platform that carries the transmit antenna also carries associated transmitting units, and a receiver platform that carries the receive antenna also carries associated receiving units.

3. A radar system according to claim 2, wherein the transmit antenna that is arranged on the transmitter platform is designed to be narrow-beam and that through the transmit antenna, the ambiguity suppression is generated both in azimuth as well as in elevation, and that the receive antenna that is arranged on the receiver platform has antenna characteristics such that the receive antenna illuminates at least approximately an entire given access area to be imaged.

4. A radar system according to claim 3, wherein to cover an access area, a plurality of narrow-beam antennas covering swaths that are ambiguity-free are provided, with the antennas oriented so that, in an entirety thereof, by combining a plurality of such swaths that are free of ambiguities the antennas cover the entire access area.

5. A radar system according to claim 3, wherein to cover an access area, a narrow-beam electronically phased antenna array is provided that covers swaths, which are free of ambiguities, through steering of the main lobe.

6. A radar system according to claim 5, wherein the antenna array is divided into a plurality of lines in the elevation, each of which has a time delay shifter so that a signal time delay of each antenna line can be adjusted separately before signals of the individual lines are added up to an antenna sum signal, and that amplitude adjusters are added up to phase or time delay shifters for an adjustment of the antenna main lobe width and pointing.

7. A radar system according to claim 6, wherein the electronically phased antenna array is arranged as a receive antenna on a receiver platform, that, in the assigned receiver unit following a phased antenna array, a low-noise amplifier (22), a filter (23) for suppression of ambiguities in the frequency range, as well as a fast analog/digital converter (24) are provided for each antenna line (Z1 . . . ZN), and that the antenna sum signal is formed only subsequently in a computer (25).

8. A radar system according to claim 2, wherein the receive antenna that is arranged on the receiver platform is designed to be narrow-beam and that through the receive antenna, the ambiguity suppression is generated both in azimuth as well as in elevation, and that the transmit antenna that is arranged on the transmitter platform has antenna characteristics such that it illuminates at least approximately an entire given access area to be imaged.

9. A radar system according to claim 2, wherein to generate an ambiguity suppression in azimuth, the transmit antenna that is arranged on the transmitter platform is designed to be narrow-beam in azimuth, according to resolution requirements, whereas it is considerably less narrow-beam for an elevation level so that the transmit antenna illuminates an entire access area or at least a large portion of the access area in the elevation, that, to generate an ambiguity suppression in the elevation, the receive antenna that is arranged on the receiver platform is designed to be narrow-beam in the elevation according to required resolution, whereas the receive antenna is designed comparatively significantly less narrow-beam for the azimuth level, so that it illuminates the entire access area or at least a large portion of the access area in the azimuth, and that minimum directionality required for the ambiguity suppression is defined by a resulting interface of footprints of both the transmit antenna and receive antenna.

10. A radar system according to claim 2, wherein the transmit antenna with an associated transmitter is arranged on a geostationary (GEO) satellite platform and that one or more receive antennas are arranged with associated receiving units on one or more satellite platforms that move in a near earth orbit (LEO) or on aircraft-mounted platforms, which receive backward scatter from radar waves.

11. A radar system according to claim 2, wherein the transmit antenna with an associated transmitter is arranged on a geostationary (GEO) satellite platform and that one or more receive antennas with associated receiver units are arranged on one or more satellite platforms that move in a near earth orbit (LEO) or on aircraft-mounted platforms, which receive a forward scatter from radar waves.

12. A radar system according to claim 2, wherein, the transmit antenna with an associated transmitter is mounted on a satellite platform that moves in a near earth orbit (LEO), and that one or more receive antennas with their associated receiver units are arranged on satellite platforms, which move on an identical orbit, but time-shifted.

13. A radar system according to claim 2, wherein the transmit antenna with an associated transmitter is mounted on a satellite platform that moves in a near earth orbit (LEO) and that one or more receive antennas with their associated receiver units are arranged on satellite platforms, which move on different orbits.

14. A radar system according to claim 2, the transmit antenna with an associated transmitter is mounted on a satellite platform that moves in a near earth orbit (LEO) and that one or more receive antennas with their associated receiver units are arranged on aircraft based platforms.

15. A radar system according to claim 2, wherein the transmit antenna with an associated transmitter is mounted on a platform located on a mountain top (BG) and that one or more receive antennas with the associated receiver units are arranged on satellite platforms, which move on a near earth orbit (LEO).

16. A radar system according to claim 2, wherein the transmit antenna with an associated transmitter is mounted on a platform located on a mountain top (BG) and that one or more receive antennas with the associated receiving units are arranged on aircraft based platforms.

17. A radar system according to claim 1, further comprising a digital chirp generator for generating a transmit signal constituted by a periodic FMCW signal, said generator being connected for supplying the transmit signal to the transmit antenna.

* * * * *